United States Patent [19]

Choi

[11] Patent Number: 5,826,176
[45] Date of Patent: Oct. 20, 1998

[54] SLIDABLE CARD RECEPTOR FOR USE IN A SATELLITE BROADCASTING TUNER

[75] Inventor: Yong-Hwan Choi, Seoul, Rep. of Korea

[73] Assignee: Daewoo Electronics Co., Ltd., Seoul, Rep. of Korea

[21] Appl. No.: 731,810

[22] Filed: Oct. 21, 1996

[30] Foreign Application Priority Data

Oct. 19, 1995 [KR] Rep. of Korea .................. 1995-36213

[51] Int. Cl.⁶ .................................................. H04B 1/38
[52] U.S. Cl. ........................... 455/90; 455/558; 455/348; 455/351
[58] Field of Search ............................ 455/90, 127, 575, 455/347, 348, 349, 351, 558; 361/684, 685, 737, 740, 725, 726; 439/923, 152; 379/357; 292/347.17, 210

[56] References Cited

U.S. PATENT DOCUMENTS

| | | | |
|---|---|---|---|
| 4,975,805 | 12/1990 | Schmultzer | 439/152 |
| 5,035,455 | 7/1991 | Kurosaki | 292/341.17 |
| 5,248,569 | 9/1993 | Pine et al. | 455/90 |
| 5,315,478 | 5/1994 | Cadwell et al. | 361/684 |
| 5,379,184 | 1/1995 | Barraza et al. | 361/685 |
| 5,386,407 | 1/1995 | Park | 369/77.2 |
| 5,562,468 | 10/1996 | Sakai et al. | 439/923 |
| 5,572,399 | 11/1996 | Shirato | 361/680 |
| 5,586,003 | 12/1996 | Schmitt et al. | 361/684 |
| 5,628,055 | 5/1997 | Stein | 455/127 |
| 5,634,080 | 5/1997 | Kikinis | 455/575 |
| 5,657,210 | 8/1997 | Yamanaka | 361/814 |

FOREIGN PATENT DOCUMENTS 0599 244 A2   6/1994   European Pat. Off. .

*Primary Examiner*—Nguyen Vo
*Assistant Examiner*—Edan Orgad
*Attorney, Agent, or Firm*—Anderson, Kill & Olick, P.C.

[57] ABSTRACT

A card receptor for use in a satellite broadcasting tuner includes a housing having a case slot, a door rotatably mounted to the housing, for opening and closing the case slot, a card case for receiving and keeping a card therein, the card case slidable between an inside position and an outside position of the housing through the case slot, a case guider fixedly mounted on an inside of the housing, corresponding to the case slot, in order to guide the sliding movement of the card case and a case locker for locking and unlocking the card case to and from the housing, respectively.

14 Claims, 3 Drawing Sheets

SLIDABLE CARD RECEPTOR FOR USE IN A SATELLITE BROADCASTING TUNER

FIELD OF THE INVENTION

The present invention is directed to a card receptor for use in a tuner or a receiver for receiving a signal from a broadcasting satellite; and, more particularly, to a card receptor having a card case slidable between a protruding position thereof for an inserting and an extracting operations of a card, and a withdrawn position for protecting the card in use.

DESCRIPTION OF THE PRIOR ART

In order to receive a signal from a broadcasting satellite positioned directly above the equator, which is sent from a broadcasting network or station on the ground, a tuner including a parabola antenna and a converter is required. The signal received by the antenna is converted by the converter into a video or an audio signal, which is then sent to a TV or audio appliances by the tuner.

A partial perspective view of a conventional tuner 80 for use in a satellite broadcast receiving system is depicted in FIG. 1. The tuner 80 has a card slot 86 on a front panel constituting a part of a housing 82, through which a program subscription fee card 84 is inserted or extracted. The card slot 86 is exposed outside the housing 82 and provided with a center concave portion 88 for helping the user to grasp the card 84.

While the prior art card slot described above is capable of performing its assigned task, needs have continued to exist for an improved card receptor, in that the card is easily be contaminated with dusts, motes and other particles in the conventional card slot.

SUMMARY OF THE INVENTION

It is, therefore, a primary object of the invention to provide a card receptor capable of enclosing a card from its surroundings to thereby eschew the possibility of contamination.

The above and other objects of the invention are accomplished by providing a card receptor for use in a satellite broadcasting tuner comprising: a housing having a case slot therethrough; a door rotatably mounted to the housing, for opening and closing the case slot; a card case for receiving and keeping a card therein, the card case slidable between an inside position and an outside position of the housing through the case slot; a case guider fixedly mounted on an inside of the housing, corresponding to the case slot, in order to guide the sliding movement of the card case; and a case locking means for locking the card case to the housing and for unlocking the card case from the housing.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE PREFERRED EMBODIMENTS

A preferred embodiment of the inventive card receptor will be now described with reference to FIGS. 2 and 3.

Figure 1:
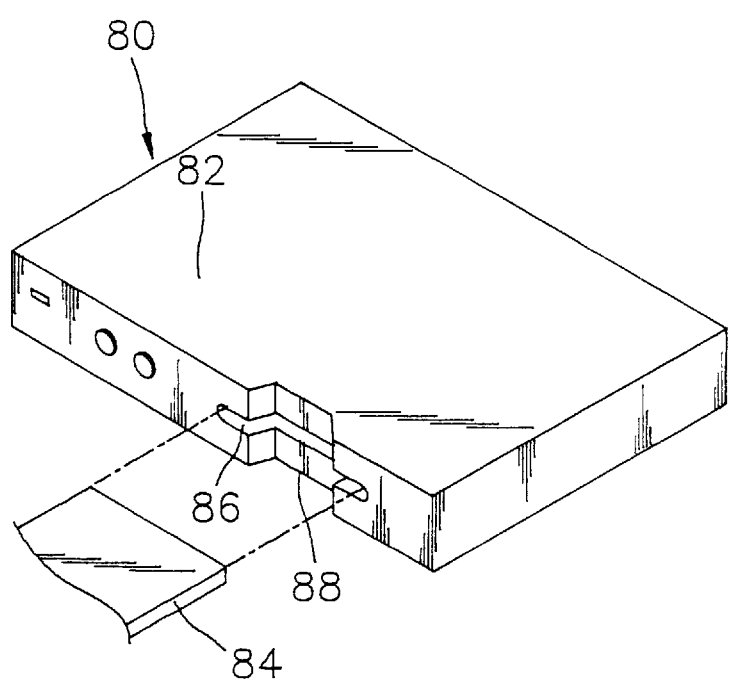
FIG. 1 shows a partial perspective view of a prior art card receptor for use in a satellite broadcasting tuner.
Figure 2:
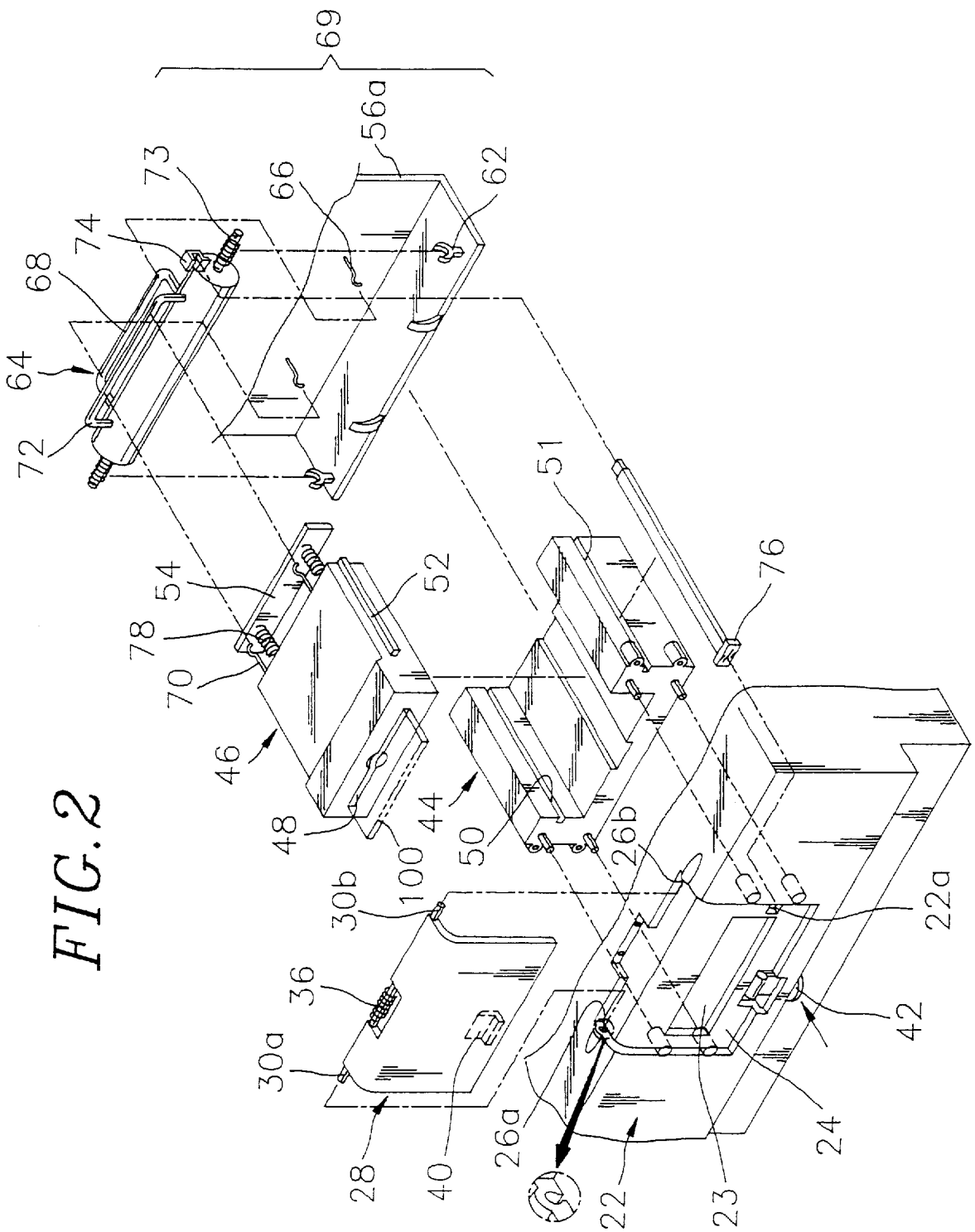
FIG. 2 represents a partial perspective view of a card receptor in accordance with the present invention.
Figure 3:
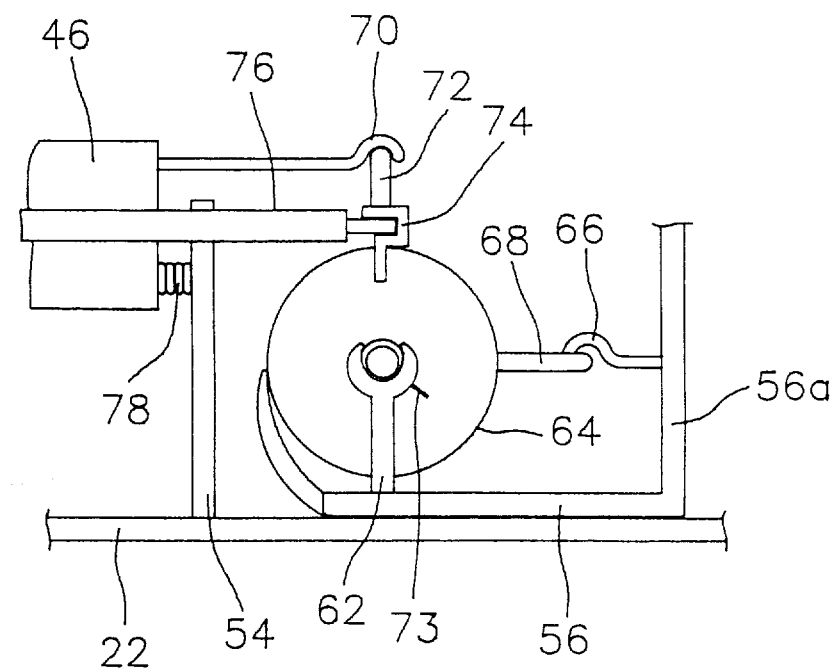
FIG. 3 illustrates a side elevational view of a case locking device of the card receptor in FIG. 2.

FIG. 2 is a partial perspective view of the inventive card receptor. A door 28 is rotatably mounted to a front panel of a housing 22 in such a manner that door shafts 30a and 30b are engaged within shaft holes 26a and 26b, respectively. The shaft holes 26a and 26b are shaped on upper portions of a recess 24 on the housing 22 which is sunken from the front panel by a substantially same dimension as the thickness of the door 28. The shaft hole 26a has a C-shaped cross-section, as enlargedly illustrated, and the shaft hole 26b has a circular cross-section. In assembling the door 28 into the housing 22, the door shaft 30b is first inserted into the shaft hole 26b in a longitudinal direction, and then the shaft 30a is fitted into the shaft hole 26a in a transverse direction. The door 28 mounted to the housing 22 in this manner is resiliently biased toward its opening position by a tension spring 36.

A locking lug 40 formed on a free end of the door 28 cooperates with a locking knob 42 on a lower portion of the recess 24 to thereby lock the door 28 to the housing 22. The locking knob 42 is adapted to release the locked door 28 when it is pushed in a direction indicated by the an arrow.

On the other hand, a card case slot 23 is formed through the recess 24, through which a card case 46 protrudes out of the housing 22 or retreats inside.

The card case 46 has a card slot 48 formed on a front surface thereof through which a card 100 is inserted or extracted. The card case 46 is horizontally slidable on a case guider 46 of a general U-shaped configuration. For this function, the card case 46 has a pair of guide rails 52; and the case guider 44 has a pair of corresponding guide surfaces 50 to the guide rails 52. The card case 46 mounted in this manner on the case guider 44 is slidable between a protruding position, wherein the card slot 48 is outside the housing 22, protruding therefrom, and a withdrawn position wherein the card slot 48 is withdrawn and is substantially flushed with the recess 24.

Positioned behind the card case 46 is a case locking device 69 for locking the card case 46 to the housing 22 in the withdrawn position and for releasing the same 46 from the withdrawn position to the protruding position. Hereinafter, the case locking device 64 will be now explained with reference to FIG. 3.

A cylindrical body 64 is mounted on supports 62 standing on a bracket 56, counterclockwisely biased by a spring 73. A first and a second racks 72 and 68 extend from external surfaces of the cylindrical body 64. The first rack 72 cooperates with a first elastic hook 70 fixed to a rear surface of the card case 46. The second rack 68 cooperates with a second elastic hook 66 formed on a bracket wall 56a. A stopping wall 54 is fixed to the housing 22 behind the card case 46. A spring 78 for biasing the card case 46 toward the protruding position is mounted between the card case 46 and the stopping wall 54.

The first elastic hook 70 is snapped over the first rack 72, thereby locking the card case 46 to the bracket 56, when the card case 46 retreats and arrives at the withdrawn position thereof. The second elastic hook 66 is to stop a counter-clockwise rotational movement of the cylindrical body 64 caused by a biasing force of the springs 73 and/or 78 by being engaged in the second rack 68.

In order to release the card case 46 from the withdrawn position, a button 76 and a button abutment 74 are prepared. Initially, the button 76 is positioned out of a button slot 22a as shown in FIG. 2. When pushed, the button 76 slides into the housing 22 along a guiding surface 51 shaped on an external lateral surface of the case guider 44 until it comes into contact with the button abutment 74. In response to the contact with the button 76, the button abutment 74 rotates the cylindrical body 64 clockwise to thereby disengage the first rack 72 from the first elastic hook 70, as shown in FIG. 3. On the disengagement of the first elastic hook 70, the card case 46 runs away from the withdrawn position toward the protruding position by the biasing force of the spring 78, through the case slot 23, to thereby protrude out of the housing 22, as shown in FIG. 2.

Although the invention has been shown and described with respect to the preferred embodiments, it will be understood by those skilled in the art that various changes and modifications may be made without departing from the spirit and scope of the invention as defined in the following claims.

What is claimed is:

1. A card receptor for use in a satellite broadcasting tuner comprising:

a housing having a case slot therethrough;

a door rotatable mounted to the housing, for opening and closing the case slot;

a card case for receiving and keeping a card therein, the card case slidable between an inside position and an outside position of the housing through the case slot;

a case guider fixedly mounted on an inside of the housing, corresponding to the case slot, in order to guide the sliding movement of the card case; and a case locking means for locking the card case with respect to the housing and for unlocking the card case from the housing, the case locking means including an elastic hook protruding from a rear portion of the card case, a cylindrical body rotatably mounted behind the card case, biased by a tension spring in a first rotating direction and having a hook-seat radially protruding from an external surface of the cylindrical body and a means for limiting a rotating movement of the cylindrical body in the first rotating direction to make the hook-seat pose in an engagable orientation with the elastic hook, when the card case slides into the inside position, a stopping wall fixedly mounted behind the card case, a spring mounted between the card case and the stopping wall, for biasing the card case toward the outside position, and a disengaging means for disengaging the elastic hook from the hook-seat by rotating the cylindrical body in a second rotating direction.

2. The card receptor of claim 1, wherein the rotating limitation means comprises:

a stopping rack radially protruding from the external surface of the cylindrical body; and a stopping hook formed on a bracket fixed in a housing and adapted to block a rotational movement of the stopping rack in a first rotating direction.

3. The card receptor of claim 1, wherein the disengaging means comprises:

a button slidable in a same direction as the sliding movement of the card case; and a button abutment so mounted on a lateral surface of the cylindrical body as to be rotated by a contact with the button, when the button is pushed.

4. The card receptor of claim 1, wherein the card case includes a pair of guide rails along lateral surfaces thereof and the case guider includes a pair of guiding surfaces corresponding to the guide rails on inner lateral surfaces.

5. The card receptor of claim 4, wherein the case guider further includes a guiding groove for guiding the slide movement of the card case.

6. The card receptor of claim 1, wherein the door includes a locking lug formed on a free end thereof and the housing includes a locking knob adapted to cooperate with the locking lug in order to locking or unlocking the door to or from the housing.

7. The card receptor of claim 6, wherein the door further includes a pair of shafts laterally protruding therefrom and the housing further includes a pair of shaft holes, one of the holes having a substantially O-shaped cross-section and other having a substantially C-shaped cross-section.

8. A card receptor for use in a satellite broadcasting tuner comprising:

a housing having a case slot therethrough;

a door rotatable mounted to the housing, for opening and closing the case slot;

a card case for receiving and keeping a card therein, the card case slidable between an inside position and an outside position of the housing through the case slot, and the card case including a pair of guide rails along lateral surfaces thereof;

a case guider fixedly mounted on an inside of the housing, corresponding to the case slot, in order to guide the sliding movement of the card case, the case guider including a pair of guiding surfaces corresponding to the guide rails on inner lateral surfaces and a guiding groove for guiding the slide movement of the card case; and a case locking means for locking the card case with respect to the housing and for unlocking the card case from the housing.

9. The card receptor of claim 8, wherein the card case includes a pair of guide rails along lateral surfaces thereof and the case guider includes a pair of guiding surfaces corresponding to the guide rails on inner lateral surfaces.

10. The card receptor of claim 8, wherein the case locking means comprises:

an elastic hook protruding from a rear portion of the card case;

a cylindrical body rotatably mounted behind the card case, biased by a tension spring in a first rotating direction and having a hook-seat radially protruding from an external surface of the cylindrical body and a means for limiting a rotating movement of the cylindrical body in the first rotating direction to make the hook-seat pose in an engagable orientation with the elastic hook, when the card case slides into the inside position;

a stopping wall fixedly mounted behind the card case;

a spring mounted between the card case and the stopping wall, for biasing the card case toward the outside position; and a disengaging means for disengaging the elastic hook from the hook-seat by rotating the cylindrical body in a second rotating direction.

11. The card receptor of claim 10, wherein the rotating limitation means comprises:

a stopping rack radially protruding from the external surface of the cylindrical body; and a stopping hook formed on a bracket fixed in a housing and adapted to block a rotational movement of the stopping rack in a first rotating direction.

12. The card receptor of claim 10, wherein the disengaging means comprises:

a button slidable in a same direction as the sliding movement of the card case; and a button abutment so mounted on a lateral surface of the cylindrical body as to be rotated by a contact with the button, when the button is pushed.

13. The card receptor of claim 8, wherein the door includes a locking lug formed on a free end thereof and the housing includes a locking knob adapted to cooperate with the locking lug in order to locking or unlocking the door to or from the housing.

14. The card receptor of claim 13, wherein the door further includes a pair of shafts laterally protruding therefrom and the housing further includes a pair of shaft holes, one of the holes having a substantially O-shaped cross-section and other having a substantially C-shaped cross-section.

* * * * *

UNITED STATES PATENT AND TRADEMARK OFFICE

CERTIFICATE OF CORRECTION

PATENT NO.    : 5,826,176
DATED         : October 20, 1998
INVENTOR(S)   : Yong-Hwan Choi It is certified that error appears in the above-identified patent and that said Letters Patent is hereby corrected as shown below:

```
     On the title page, item
   [30]       Foreign Application Priority Data Oct. 19, 1995   [KR]   Rep. of Korea              95-36213
```

Signed and Sealed this

Thirtieth Day of March, 1999

Attest:

Q. TODD DICKINSON

*Attesting Officer*    Acting Commissioner of Patents and Trademarks